(12) United States Patent
Han et al.

(10) Patent No.: US 11,127,322 B2
(45) Date of Patent: Sep. 21, 2021

(54) FLEXIBLE DISPLAY DEVICE

(71) Applicant: WuHan TianMa Micro-electronics CO., LTD., Wuhan (CN)

(72) Inventors: Qing Han, Wuhan (CN); Jiang Chen, Wuhan (CN)

(73) Assignee: WuHan TianMa Micro-electronics CO., LTD., Wuhan (CN)

( * ) Notice: Subject to any disclaimer, the term of this patent is extended or adjusted under 35 U.S.C. 154(b) by 52 days.

(21) Appl. No.: 16/821,839

(22) Filed: Mar. 17, 2020

(65) Prior Publication Data
US 2021/0150942 A1 May 20, 2021

(30) Foreign Application Priority Data

Nov. 19, 2019 (CN) .......................... 201911136229.7

(51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC combination set(s) only.
See application file for complete search history.

(56) References Cited

U.S. PATENT DOCUMENTS

| 7,310,050 B2* | 12/2007 | Yeh | G06F 1/1624 |
| | | | 340/815.4 |
| 8,096,068 B2* | 1/2012 | Van Rens | G09F 11/29 |
| | | | 40/515 |
| 8,376,581 B2* | 2/2013 | Auld | G09F 9/301 |
| | | | 362/249.02 |
| 8,516,728 B2* | 8/2013 | Jung | G09F 9/301 |
| | | | 40/610 |
| 9,756,757 B2* | 9/2017 | Park | H05K 5/0017 |

(Continued)

FOREIGN PATENT DOCUMENTS

| CN | 204215671 U | 3/2015 |
| CN | 105280668 A | 1/2016 |

(Continued)

OTHER PUBLICATIONS

First Chinese Office Action, dated Mar. 3, 2021, issued in corresponding Chinese Application No. 201911136229.7, filed Nov. 19, 2019, 18 pages.

*Primary Examiner* — Lisa Lea-Edmonds
(74) *Attorney, Agent, or Firm* — Christensen O'Connor Johnson Kindness PLLC

(57) ABSTRACT

A flexible display device, comprising: a box comprising a housing part and a winding shaft fixed in a receiving space defined by the housing part; a flexible display part comprising a flexible display panel and a flexible carrying part attached on a non-display surface of the flexible display panel, wherein a first end of the flexible display part is fixed to the winding shaft; and a limit part movably disposed in a side wall of the box, wherein in a wound state, the flexible display part is wound onto the winding shaft and received in the receiving space; and in an unwound state, a second end of the flexible display part and at least a portion of the flexible display part are unwound to an exterior of the receiving space, and the limit part contacts the flexible carrying part to limit movement of the flexible display part.

19 Claims, 6 Drawing Sheets

(56) References Cited

U.S. PATENT DOCUMENTS

| | | | |
|---|---|---|---|
| 9,772,657 B2* | 9/2017 | Takayanagi | H04M 1/0268 |
| 9,860,353 B2* | 1/2018 | Lee | G06F 1/1652 |
| 9,864,412 B2* | 1/2018 | Park | G06F 1/1652 |
| 9,877,400 B2* | 1/2018 | Wang | H05K 7/1401 |
| 10,319,263 B2* | 6/2019 | Lee | G06F 1/1652 |
| 10,410,549 B1* | 9/2019 | Kim | G06F 1/1601 |
| 10,506,726 B2* | 12/2019 | Kang | H01L 51/5237 |
| 10,531,582 B2* | 1/2020 | Park | H05K 5/0217 |
| 10,534,402 B1* | 1/2020 | Kim | H05K 5/0217 |
| 10,564,676 B2* | 2/2020 | Kwon | G06F 1/1652 |
| 10,599,185 B2* | 3/2020 | Yu | G06F 1/1652 |
| 10,613,588 B2* | 4/2020 | Chang | H05K 5/0217 |
| 10,642,315 B2* | 5/2020 | Kim | G09F 9/301 |
| 10,687,428 B2* | 6/2020 | Kim | H05K 5/0217 |
| 10,691,172 B2* | 6/2020 | Jovanovic | G09F 9/00 |
| 10,694,627 B2* | 6/2020 | Park | H05K 5/0217 |
| 10,747,269 B1* | 8/2020 | Choi | G06F 1/1656 |
| 10,748,456 B2* | 8/2020 | Pyo | F16M 11/38 |
| 10,769,971 B2* | 9/2020 | Kim | G06F 1/1601 |
| 10,782,740 B2* | 9/2020 | Kim | H04R 7/045 |
| 10,868,264 B2* | 12/2020 | Shin | H04M 1/0268 |
| 10,888,005 B2* | 1/2021 | Lee | H05K 5/0217 |
| 10,890,947 B2* | 1/2021 | Choi | H05K 5/0017 |
| 10,973,136 B2* | 4/2021 | Park | G09F 9/301 |
| 10,976,778 B2* | 4/2021 | Pyo | H05K 5/0017 |
| 11,003,207 B2* | 5/2021 | Kim | G06F 1/1652 |
| 2017/0023978 A1* | 1/2017 | Cho | H04M 1/0268 |
| 2019/0198783 A1* | 6/2019 | Kim | H01L 51/5281 |
| 2020/0068728 A1* | 2/2020 | Kang | H05K 5/0247 |
| 2020/0077194 A1* | 3/2020 | Kim | H04R 7/04 |
| 2020/0160760 A1* | 5/2020 | Park | H04R 9/066 |
| 2020/0202753 A1* | 6/2020 | Qu | H05K 7/20972 |
| 2020/0314552 A1* | 10/2020 | Kim | G06F 1/1605 |
| 2020/0363841 A1* | 11/2020 | Kim | G06F 1/1675 |
| 2020/0379517 A1* | 12/2020 | Kim | H05K 5/0017 |
| 2020/0394942 A1* | 12/2020 | Kim | G09F 9/301 |
| 2020/0396850 A1* | 12/2020 | Kim | G02F 1/133305 |
| 2020/0402434 A1* | 12/2020 | Yamazuki | H04N 5/66 |
| 2021/0004056 A1* | 1/2021 | Kim | H01L 51/0097 |
| 2021/0007230 A1* | 1/2021 | Kang | H05K 5/03 |
| 2021/0029839 A1* | 1/2021 | Kwon | G09F 9/301 |
| 2021/0029840 A1* | 1/2021 | Kwon | H05K 5/0217 |
| 2021/0051809 A1* | 2/2021 | Song | H05K 5/0217 |
| 2021/0056872 A1* | 2/2021 | Kwon | G09F 9/301 |
| 2021/0074189 A1* | 3/2021 | Kwon | H05K 5/0017 |
| 2021/0083024 A1* | 3/2021 | Song | H01L 27/3276 |
| 2021/0084779 A1* | 3/2021 | Lee | H05K 5/0221 |
| 2021/0090476 A1* | 3/2021 | Kang | G06F 1/1652 |
| 2021/0124400 A1* | 4/2021 | Pyo | G06F 1/1652 |
| 2021/0135492 A1* | 5/2021 | Kim | H01Q 1/38 |
| 2021/0142698 A1* | 5/2021 | Oh | G09F 9/301 |
| 2021/0144868 A1* | 5/2021 | Song | H05K 5/0017 |
| 2021/0150946 A1* | 5/2021 | Song | H01L 51/5293 |

FOREIGN PATENT DOCUMENTS

| | | |
|---|---|---|
| CN | 107170370 A | 9/2017 |
| CN | 107256679 A | 10/2017 |
| CN | 206789253 U | 12/2017 |

* cited by examiner

FLEXIBLE DISPLAY DEVICE

CROSS REFERENCE TO RELATED APPLICATION

The present application claims priority to Chinese Patent Application No. 201911136229.7, filed on Nov. 19, 2019, the content of which is incorporated by reference in its entirety.

TECHNICAL FIELD

The present disclosure relates to the field of display technologies, and in particular, to a flexible display device.

BACKGROUND

With the rapid development of display technologies, traditional flat display panels can no longer meet consumers' needs, and accordingly, flexible display panels have emerged.

The flexible display panel can be applied to a portable display device. When used, the flexible display panel can be unwound into a flat state; and when not used, the flexible display panel may be wound or folded so as to be received in a storage box.

In the portable display device provided by the related art, a guide structure for the flexible display panel is complicated, can be damaged easily, and has a high cost and a low accuracy, causing that the display panel cannot be accurately fixed at a set position when it is unwound, thus affecting the user experience.

SUMMARY

In view of this, the present disclosure provides a flexible display device, aiming to solve the technical problems described in the background.

The present disclosure provides a flexible display device, including: a box including a housing part and a winding shaft fixedly connected to the housing part, the winding shaft being located in a receiving space defined by the housing part; a flexible display part including a flexible display panel and a flexible carrying part attached on a non-display surface of the flexible display panel, a first end of the flexible display part being fixedly connected to the winding shaft; and a limit part movably disposed in a side wall of the box, the flexible display part having a wound state and an unwound state, where in the wound state, the flexible display part is wound onto the winding shaft so as to be received in the receiving space; and in the unwound state, a second end of the flexible display part and at least a portion of the flexible display part are unwound to an exterior of the receiving space, and the limit part is in contact with the flexible carrying part to limit movement of the flexible display part.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, and based on these drawings, other drawings can also be acquired by those skilled in the art.

Figure 1:
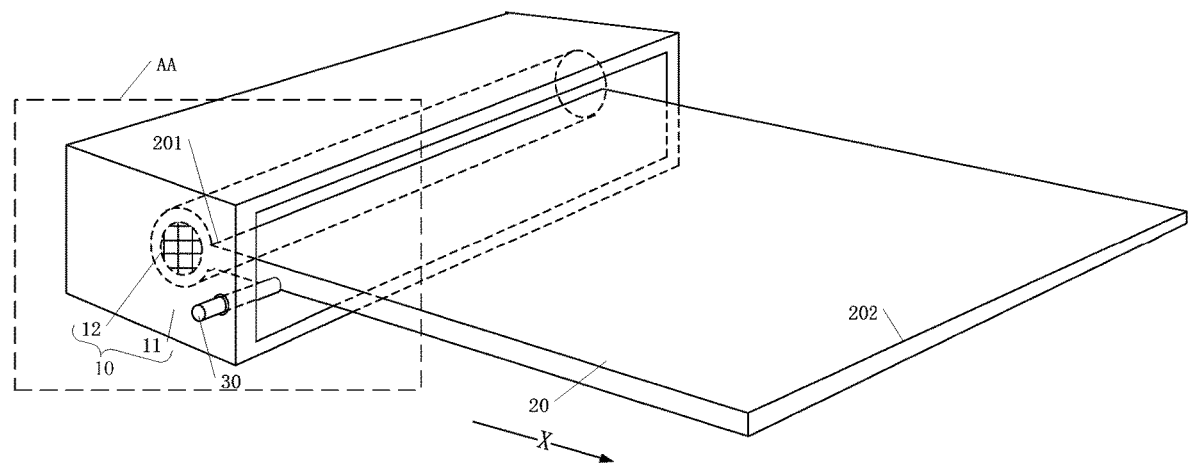
FIG. 1 is a perspective view of a flexible display device according to an embodiment of the present disclosure.

REFERENCE NUMERALS 10 box
20 flexible display part
11 housing part
12 winding shaft
201 first end
202 second end
203 third end
204 fourth end
21 flexible display panel
22 flexible carrying part
30 limit part
23 limit groove
13/14 through hole
40/41 electromagnetic coil assembly
24 protrusion portion
15 threaded hole
50 anti-slip portion
221 first sub-part
222 second sub-part
60 fixing part
61 guide groove
70 dentate groove

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as limiting the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an". "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate three cases, i.e., only A exists, both A and B exist, and only B exists. In addition, the character "/" herein generally indicates that the related objects before and after the character form an "or" relationship.

In the description of this specification, it should be understood that the terms "substantially", "almost", "about", "probably", "approximately" and "roughly" described in the claims and embodiments of the present disclosure refer to a value within a reasonable process operation range or tolerance range, which can be substantially agreed, rather than an exact value.

Figure 2:
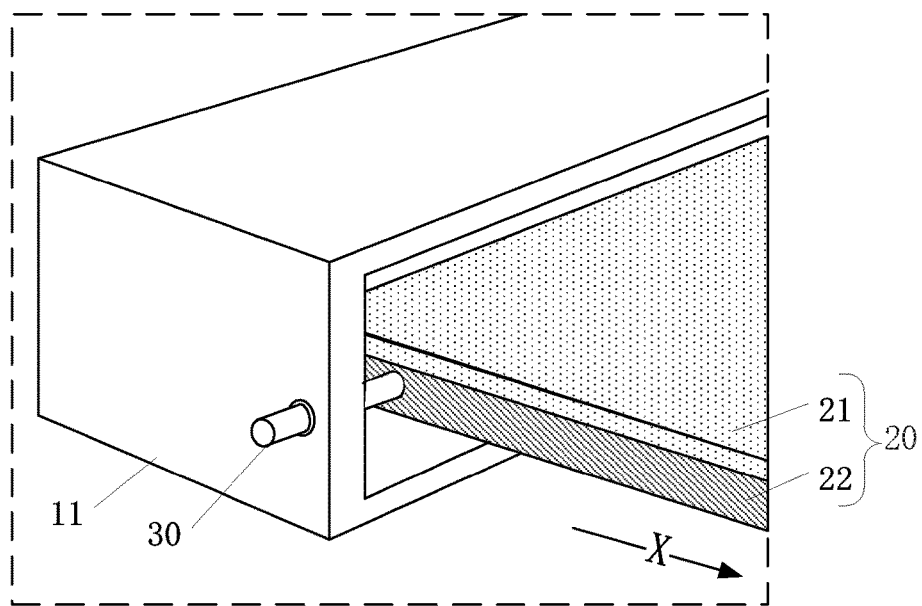
FIG. 2 is a schematic diagram of a partial structure of an area AA shown in FIG. 1.

FIG. 1 is a perspective view of a flexible display device according to an embodiment of the present disclosure. FIG. 2 is a schematic diagram of a partial structure of an area AA shown in FIG. 1.

With reference to FIG. 1 and FIG. 2, an embodiment of the present disclosure provides a flexible display device, including: a box 10 and a flexible display part 20.

The box 10 includes a housing part 11, and a winding shaft 12 fixedly connected to the housing part 11. The winding shaft 12 is disposed in a receiving space defined by the housing part 11. The flexible display part 20 includes a first end 201 that is fixedly connected to the winding shaft 12.

In a wound state, the flexible display part 20 is wound on the winding shaft 12 to be received in the receiving space. In an unwound state, a second end 202 of the flexible display part 20 and at least a portion of the flexible display part 20 are unwound to the outside of the receiving space.

The flexible display part 20 includes: a flexible display panel 21, and a flexible carrying part 22 attached on a non-display surface of the flexible display panel 21.

The flexible display device further includes a limit part 30 which is movably disposed in a side wall of the box 10. In the unwound state, the limit part 30 contacts the flexible carrying part 22 so as to limit movement of the flexible display part 20.

It should be noted that in the flexible display device provided by this embodiment, the box 10 includes the housing part 11, the housing part 11 being a hollow structure, and the winding shaft 12 is disposed in the receiving space of the housing part 11. The housing part 11 may be made of a material with a certain rigidity, such as plastic, metal, glass, ceramic, or a combination thereof, so as to protect the flexible display part 20 received therein.

The winding shaft 12 is configured for winding the flexible display part 20. The winding shaft 12 may be made of a material with a certain rigidity, such as plastic, metal, glass, ceramic, or a combination thereof. The housing part 11 and the winding shaft 12 may be made of the same material or different materials, which is not specifically limited herein.

The housing part 11 and the winding shaft 12 may be formed as a one-piece structure. For example, the housing part 11 and the winding shaft 12 may be made as a one-piece structure by an injection molding process using a plastic material. Alternatively, the housing part 11 and the winding shaft 12 may be separately formed and then assembled together. For example, the housing part 11 and the winding shaft 12 may be fixed together by an adhesive material or by means of a mechanical structure. In this embodiment, a connection manner of the housing part 11 with the winding shaft 12 is not limited.

The flexible display part 20 is soft and windable. When the user does not need to use the flexible display device, the flexible display device can be set to be in the wound state, in which the flexible display part 20 is wound on the winding shaft 12 and received in the housing part 11. In this way, the flexible display device is portable and easily received. Moreover, the housing part 1 can protect the flexible display part 20 from being damaged by external force or polluted by dust.

When the user needs to use the flexible display device, the flexible display part 20 can be drawn out from the housing part 11 along an X direction and set to be in the unwound state, in which the second end 202 of the flexible display part 20 and at least a portion of the flexible display part 20 are unwound to the outside of the receiving space. The user can completely unwind the flexible display part 20 to the outside of the housing part 11, or partially unwind the flexible display part 20 to the outside of the housing part 11.

In order to facilitate winding and unwinding of the flexible display part 20, the flexible display part 20 provided in this embodiment includes the flexible display panel 21 and the flexible carrying part 22 which is attached on the non-display surface of the flexible display panel 21. The flexible display panel 21 has a display function. The specific structure and operation mechanism of the flexible display panel 21 is known from the related art, which will not be repeated herein. The flexible display panel 21 may be an organic light-emitting display panel or an electronic paper display panel, which is not specifically limited herein.

The flexible carrying part 22 has a function of supporting and protecting the flexible display panel 21 and preventing the flexible display panel 21 from being damaged during movement. The flexible carrying part 22 may be made of a flexible material. In an embodiment, the material of the flexible carrying part 22 includes polyimide. Polyimide is an organic polymer material having the best comprehensive performance and having characteristics of high temperature resistance, insulation and bending resistance.

The flexible carrying part 22 is fixedly attached on the flexible display panel 21, so as to avoid relative movement between the flexible carrying part 22 and the flexible display panel 21 during movement of the flexible display part 20. The display panel 21 may be attached on the flexible carrying part 22 using an adhesive substance, which is not specifically limited herein.

In this embodiment, when the flexible display part 20 is drawn out from the housing part 11 and is set to be in the unwound state, in order to fix the position of the flexible display part 20, the flexible display device is further provided with a limit part 30, and the limit part 30 is movably disposed in the side wall of the box 10. Here, the term "movably" can be understood as that the limit part 30 is movable relative to the box 10 during use as required, as opposed to the case where the limit part 30 is completely fixed in the box 10 and cannot move. In the unwound state, the limit part 30 contacts the flexible carrying part 22 so as to limit movement of the flexible display part 20. For example, a friction force between the limit part 30 and the flexible carrying part 22 can limit the movement of the flexible display part 20, thereby keeping the flexible display part 20 at a fixed position.

In the flexible display device provided in this embodiment, a movable limit part 30 is provided in the side wall of the box 10. The limit part 30 has a function of limiting the movement of the flexible display part 20, and the limit part 30 limits the position of the flexible carrying part 22 by contacting the flexible carrying part 22. A structure thereof is simple and the cost is low. When the limit part 30 is damaged, it can be flexibly replaced and easily maintained. The limit part 30 can move relative to the box 10 during use as required. An operation thereof is flexible and convenient, and a position where the limit part 30 contacts the flexible carrying part 22 can be set according to actual needs, so that the flexible display part 20 is accurately fixed at a set position with high accuracy when it is unwound.

It should be understood by those skilled in the art that the flexible display device provided by the embodiments of the present disclosure may have known structures such as a power supply and a chip. In order to avoid unnecessarily obscuring technical solutions of the embodiments of the present disclosure, these known structures will not be described herein.

In the flexible display device provided by the present disclosure, the limit part contacts the flexible carrying part so as to limit the movement of the flexible display part, which can be implemented in various manners, as described separately in the following.

Figure 3:
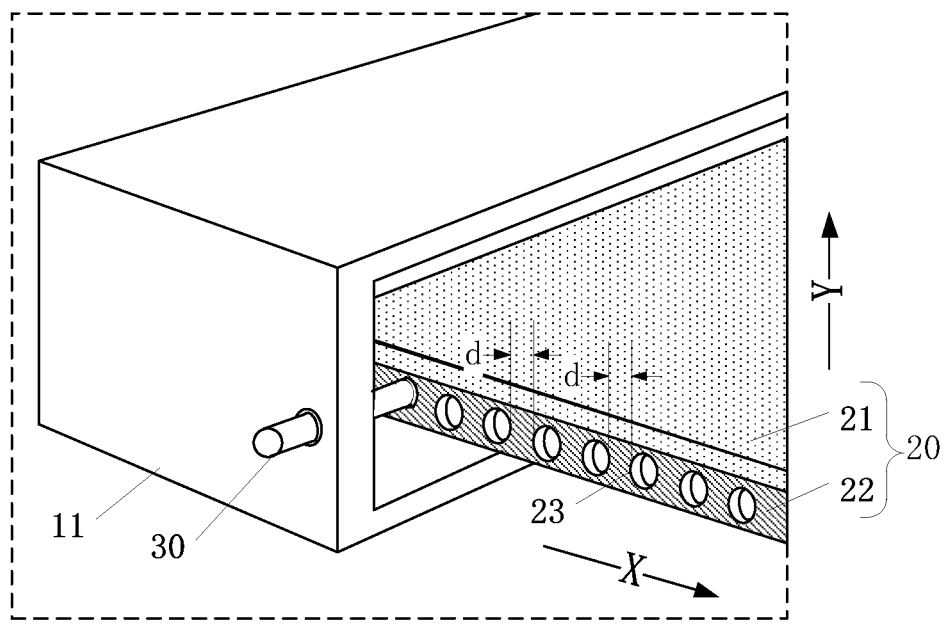
FIG. 3 is a schematic diagram of a partial structure of another flexible display device according to an embodiment of the present disclosure.

FIG. 3 is a schematic diagram of a partial structure of another flexible display device according to an embodiment of the present disclosure.

With reference FIG. 3, in this embodiment, the flexible carrying part 22 is provided with at least one limit groove 23 which matches the limit part 30. In the unwound state, the limit part 30 is inserted in the limit groove 23 so as to limit the movement of the flexible display part 20. In this embodiment, a depth of the limit groove 23 is not specifically limited.

During use of the flexible display device provided in this embodiment, when the user draws the flexible display part 20 out from the housing part 11 and sets it in the unwound state, the limit part 30 can be inserted into the limit groove 23, thereby fixing the position of the flexible display part 20. It can be understood that, in the flexible display device provided in this embodiment, the limit to a movement direction of the flexible display part 20 is bidirectional, which prevents the flexible display part 20 from moving along the X direction (e.g., +X) and the opposite direction of the X direction (e.g., −X). At the same time, the flexible display part 20 can also be prevented from moving along a Y direction which is perpendicular to the X direction. In this way, the accuracy of the position of the flexible display part 20 is further improved.

It should be noted that one, two, or more limit grooves 23 may be provided, which can be set according to actual requirements. It can be understood that additional limit grooves 23 provide more positions where the flexible display part 20 can be fixed in the unwound state.

A plurality of limit grooves 23, e.g., three or more limit grooves 23, may be provided, and these limit grooves 23 may be equally spaced from each other. Here, "equally spaced from each other" means that a distance between any two adjacent limit grooves 23 has the same value d.

Figure 4:
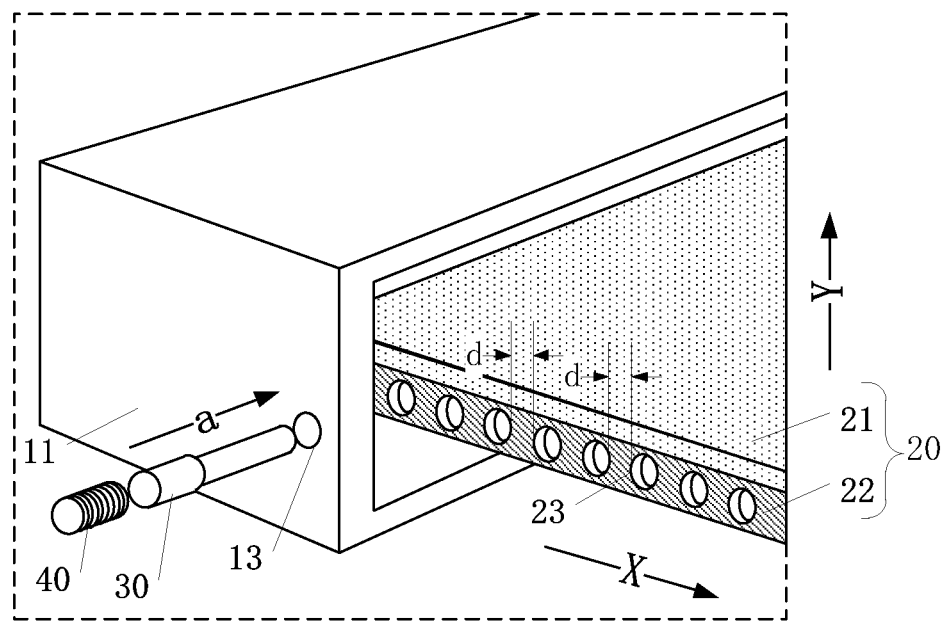
FIG. 4 is a schematic diagram of a partial structure of still another flexible display device according to an embodiment of the present disclosure.

FIG. 4 is a schematic diagram of a partial structure of still another flexible display device according to an embodiment of the present disclosure.

With reference to FIG. 4, in this embodiment, the limit part 30 includes a latch, and the side wall includes a through hole 13. The latch can move within the through hole 13 along a thickness direction of the side wall. Here, the thickness direction of the side wall refers to a direction shown as "a" in FIG. 4 and an opposite direction of the direction a.

In the unwound state, one end of the latch is inserted in limit groove 23.

It should be noted that, in order to clearly illustrate the technical solution of this embodiment, FIG. 4 illustrates a state where the latch is located outside the housing part 11.

It can be understood that, in the flexible display device provided in this embodiment, the limit to the movement direction of the flexible display part 20 is bidirectional, which can prevent the flexible display part 20 from moving along the X direction and the opposite direction of the X direction. When the flexible display device provided in this embodiment is in use by the user, the latch can be manually inserted into the limit groove 23, that is, the flexible display part 20 can be fixed at a set position. Alternatively, the limit part 30 includes an electromagnetic coil assembly 40 configured to control movement of the latch along the thickness direction of the side wall. Here, the electromagnetic coil is a device that operates according to the electromagnetic induction principle. When a current flows through a wire, a certain electromagnetic field is generated around the wire, and the wire of the electromagnetic field itself has an inducing effect on other wires within a range of the electromagnetic field. The specific structure and operation mechanism can be known in the related art, which will not be further described herein. The electromagnetic coil assembly 40 and the flexible display part 20 may share the same power source. The electromagnetic coil assembly 40 can be used to electrically control movement of the latch, thereby fixing the flexible display part 20 at a set position, and an operation thereof is simple and convenient.

It should be noted that in FIG. 3 and FIG. 4, it is only exemplary that a cross section of the latch has a circular shape. In other embodiments of the present disclosure, the cross section of the latch may have an oval shape, a rectangular shape, a triangular shape, or other shape, which is not specifically limited herein.

Figure 5:
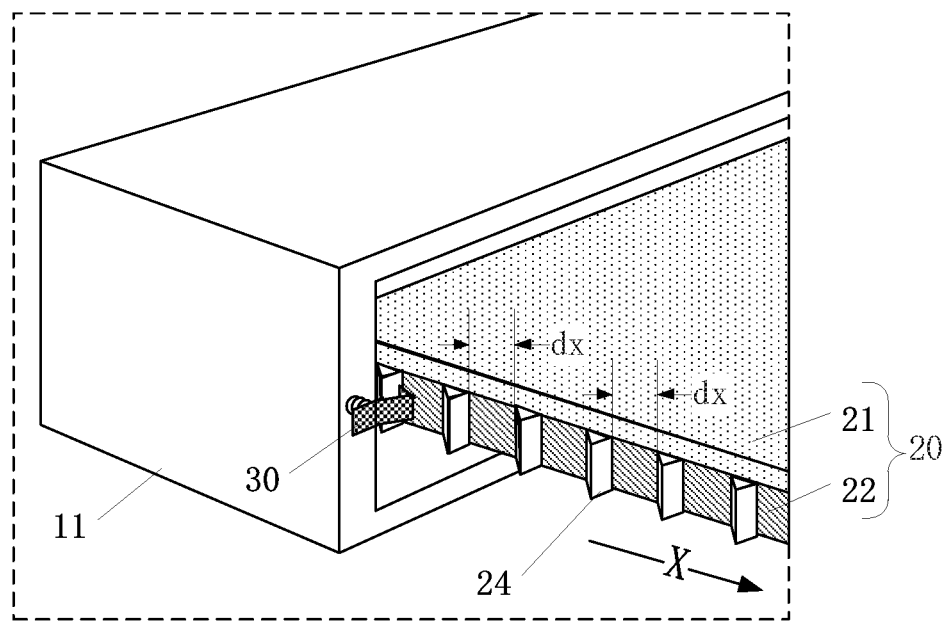
FIG. 5 is a schematic diagram of a partial structure of still another flexible display device according to an embodiment of the present disclosure.

FIG. 5 is a schematic diagram of a partial structure of still another flexible display device according to an embodiment of the present disclosure.

With reference FIG. 5, in this embodiment, the flexible carrying part 22 is provided with at least one protrusion portion 24 which matches the limit part 30.

In the unwound state, the limit part 30 is snap-fitted to the protrusion portion 24 to limit movement of the flexible display part 20.

In this embodiment, the protrusion portion 24 protrudes from the surface of the flexible carrying part 22. In the unwound state, the limit part 30 can be snap-fitted to the surface of the protrusion portion 24 so as to fix the flexible display part 20 at a set position. It can be understood that in the flexible display device provided in this embodiment, the limit to the movement direction of the flexible display part 20 is unidirectional, which can prevent the flexible display part 20 from moving along the X direction. For example, as shown in FIG. 5, when the flexible display part 20 is drawn out from the housing part 11, the limit part 30 is snap-fitted to the protrusion portion 24, so that the flexible display part 20 is fixed and thus is prevented from being further unwound. When the flexible display part 20 needs to be received, by setting a matching and cooperating configuration between the protrusion portion 24 and the limit part 30, the flexible display part 20 can smoothly move along a direction opposite to the X direction to be received in the housing part 11.

It should be noted that one, two, or more protrusion portions 24 may be provided, and the specific number of the protrusion portions 24 may be set according to actual requirements. It can be understood that additional protrusion portions 24 provide more positions where the flexible display part 20 can be fixed in the unwound state.

A plurality of protrusion portions 24, e.g., three or more protrusion portions 24, may be provided, and these protrusion portions 24 may be equally spaced from each other. Here, "equally spaced from each other" means that a distance between any two adjacent protrusion portions 23 has the same value dx.

The limit part 30 may include a flexure strip, and a first end of the flexure strip is fixedly connected to the side wall. In the unwound state, a second end of the flexure strip is snap-fitted to the protrusion portion 24. In this embodiment, the flexure strip is a formed as a thin sheet-like structure and has certain elasticity. For example, the flexure strip may be made of a metal or a resin material. The flexure strip is formed as a structure having a special bending shape. When the flexible display part 20 is drawn out from the housing part 11, the flexure strip can be firmly snap-fitted to the protrusion portion 24, so that the flexible display part 20 can be fixed and thus is prevented from being further unwound.

Figure 6:
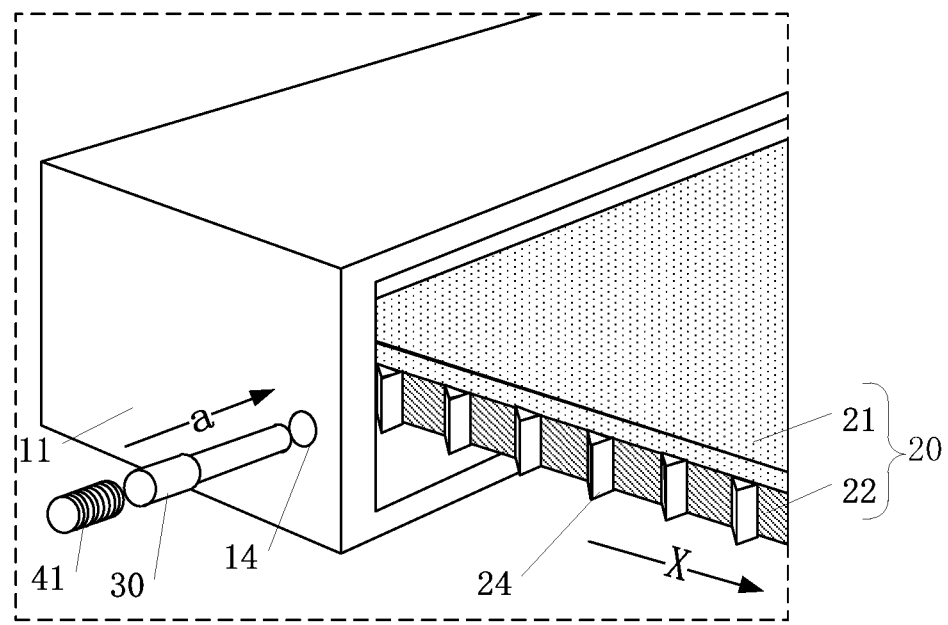
FIG. 6 is a schematic diagram of a partial structure of still another flexible display device according to an embodiment of the present disclosure.
Figure 7:
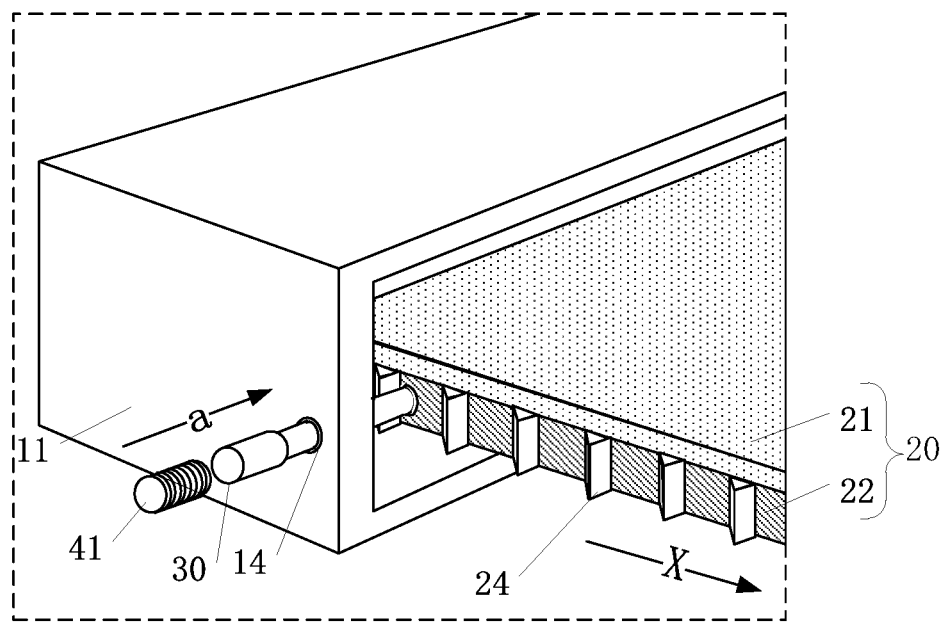
FIG. 7 is a schematic diagram of a partial structure of still another flexible display device according to an embodiment of the present disclosure.

FIG. 6 and FIG. 7 illustrate a partial structure of still another flexible display device according to an embodiment of the present disclosure. It should be noted that, in order to clearly illustrate the technical solution of the embodiment, FIG. 6 illustrates a state where the latch is located outside the housing part, and FIG. 7 illustrates a state where the latch is snap-fitted to the protrusion portion.

With reference to FIG. 6 and FIG. 7, in this embodiment, the limit part 30 includes a latch, and the side wall includes a through hole 14. The latch can move within the through hole 14 along the thickness direction of the side wall. Here, the thickness direction of the side wall refers to a direction shown as "a" in the figures and its opposite direction.

In the unwound state, an end of the latch is snap-fitted to the protrusion portion 24.

When the flexible display device provided in this embodiment is in use, the latch can be manually inserted through the through hole 14 to be snap-fitted to the protrusion portion 24, and in this way, the flexible display part 20 can be fixed at a set position. Alternatively, the limit part 30 includes an electromagnetic coil assembly 41 which is configured to control movement of the latch along the thickness direction of the side wall. Here, the electromagnetic coil is a device that operates according to the electromagnetic induction principle. When an electric current flows through a wire, a certain electromagnetic field is generated around the wire, and the wire of the electromagnetic field itself has an inducing effect on other wires within the range of the electromagnetic field. The specific structure and operation mechanism of the electromagnetic coil assembly 41 can be known from the related art, which is not further described herein.

The electromagnetic coil assembly 41 and the flexible display part 20 may share the same power source. After the electromagnetic coil assembly 41 is powered on, it can generate electromagnetic induction on the latch and control the movement of the latch, thereby fixing the flexible display part 20 at a set position, and an operation thereof is simple and convenient.

It should be noted that in FIG. 6 and FIG. 7, it is only exemplary that a cross section of the latch has a circular shape. In other embodiments of the present disclosure, the cross section of the latch may have an oval shape, a rectangular shape, a triangular shape, or any other shape, which will not be specifically limited herein.

Figure 8:
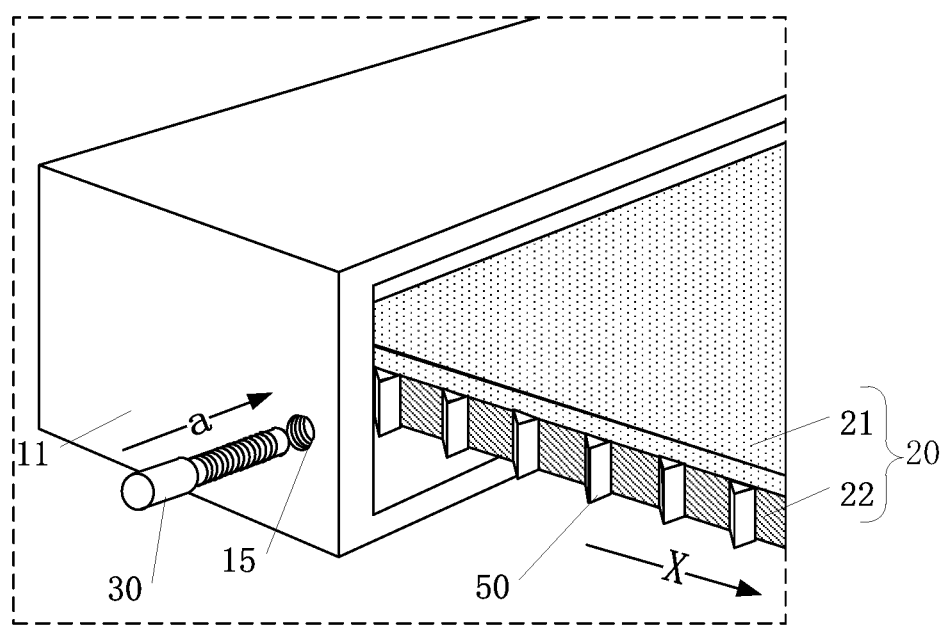
FIG. 8 is a schematic diagram of a partial structure of still another flexible display device according to an embodiment of the present disclosure.

FIG. 8 is a schematic diagram of a partial structure of still another flexible display device according to an embodiment of the present disclosure.

With reference to FIG. 8, in this embodiment, the limit part 30 includes a threaded bolt, and the side wall includes a threaded hole 15 that cooperates with the bolt. The bolt can be screwed in and out along the thickness direction of the side wall. The thickness direction of the side wall refers to a direction shown as "a" in the figure and its opposite direction.

In the unwound state, the bolt is screwed into the receiving space of the box 10 to press the flexible carrying part 22. Here, when the bolt is screwed tight, the bolt can press the flexible carrying part 22 toward the housing part 11, thereby increasing a pressure on the flexible carrying part 22 and the housing part 11, i.e., increasing a friction force between the two. In this way, the flexible display part 20 is fixed at a set position where it cannot move easily.

In the flexible display device provided in this embodiment, the bolt cooperates with the threaded hole, such that it is easy to control a degree to which the bolt is screwed into the housing part 11. When the user uses the flexible display device provided in this embodiment, the user can manually screw the bolt, so that the bolt is screwed into the receiving space of the box 10 to press the flexible carrying part 22, so that the flexible display part 20 can be fixed at a set position. It can be understood that, in the flexible display device provided in this embodiment, the limit to the movement direction of the flexible display part 20 is bidirectional, thereby preventing the flexible display part 20 from moving along the X direction and the opposite direction of the X direction.

Figure 9:
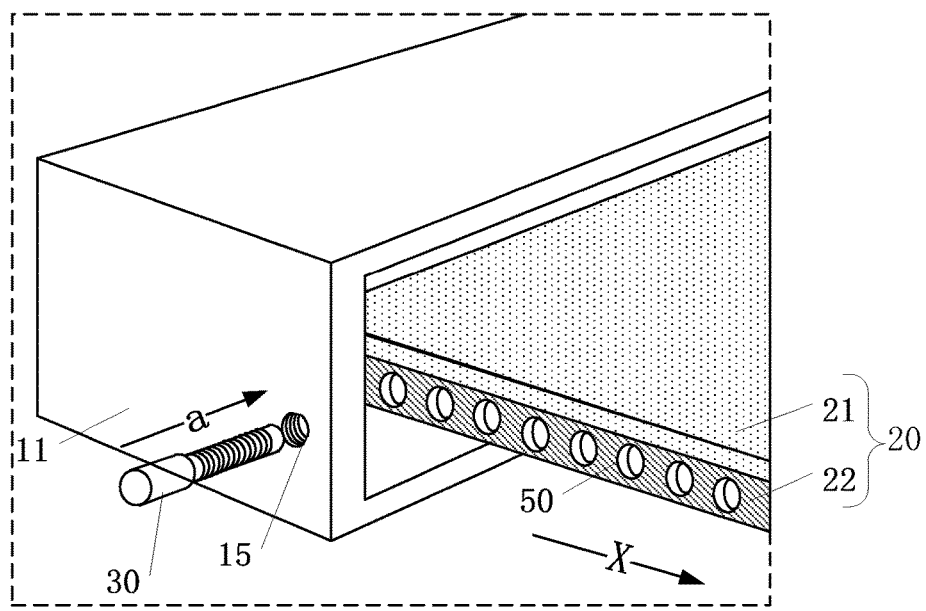
FIG. 9 is a schematic diagram of a partial structure of still another flexible display device according to an embodiment of the present disclosure.

The flexible carrying part 22 may be provided with at least one anti-slip portion 50. In the unwound state, the anti-slip portion 50 cooperates with the bolt to press the flexible carrying part 22. The anti-slip portion 50 can further strengthen a press effect of the bolt on the flexible carrying part, in order to fix the flexible display part 20 at a set position. For example, as shown in FIG. 8, the anti-slip portion 50 is an anti-slip protrusion that protrudes from the surface of the flexible carrying part 22. Alternatively, for example, as shown in FIG. 9, the anti-slip portion 50 is an anti-slip recess that is recessed into the flexible carrying part 22. The anti-slip portion can secure the bolt at the set position, thereby further increasing fixing accuracy of the flexible display part 20.

It should be noted that, in order to clearly illustrate the technical solution of this embodiment, FIG. 8 and FIG. 9 illustrate a state where the bolt is located outside the housing part 11.

In the embodiments of the present disclosure, the shape of the flexible carrying part is not specifically limited. In an example, the flexible carrying part may be planar and is attached with an entire surface on the flexible display panel. Alternatively, the flexible carrying part includes a plurality of sub-parts, each of which has a long-strip shape and extends along a direction perpendicular to the X direction.

When the flexible display part is unwound, the plurality of sub-parts is distributed and spaced from each other along the X direction.

Figure 10:
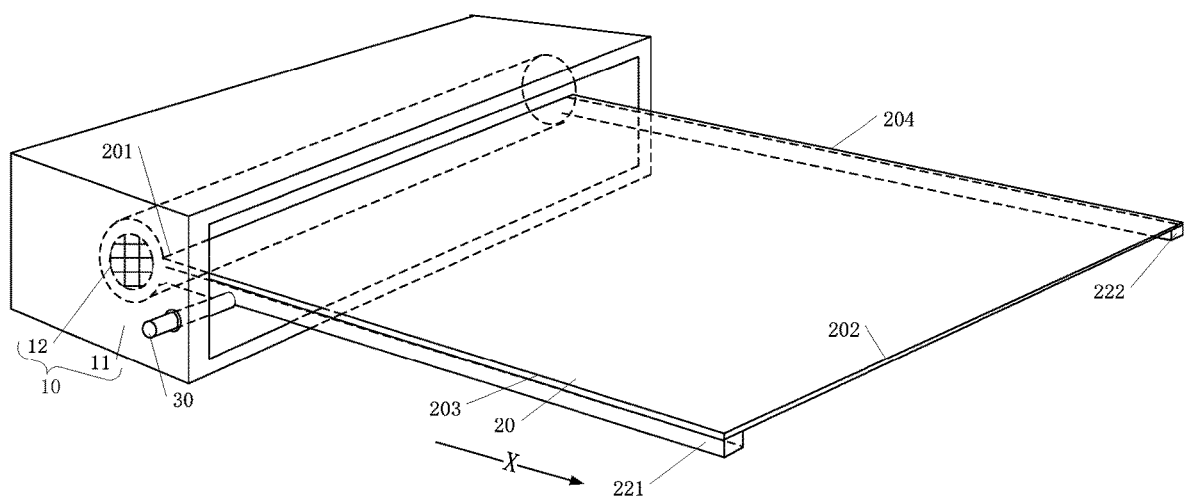
FIG. 10 is a schematic diagram of a structure of still another flexible display device according to an embodiment of the present disclosure.

FIG. 10 is a schematic diagram of a structure of still another flexible display device according to an embodiment of the present disclosure. With reference to FIG. 10, the flexible carrying part is strip-shaped.

In this embodiment, the flexible carrying part 22 includes a strip-shaped first sub-part 221 and a strip-shaped second sub-part 222. The first sub-part 221 and the second sub-part 222 are attached on a third end 203 and a fourth end 204 of the flexible display panel 21, respectively, and the third end 203 and the fourth end 204 are opposite to each other.

In the flexible display device provided in this embodiment, the sub-parts of the flexible carrying part are shaped like long strips, and are disposed respectively at two opposite edge positions of the flexible display panel 21. When the flexible display panel is unwound from the housing part 11, the flexible display panel 21 can be effectively supported. Moreover, attachment between the long-strip-shaped flexible carrying part and the flexible display panel 21 has relative low difficulty, which can reduce a process difficulty of manufacturing the flexible display device and thus improve the yield.

Figure 11:
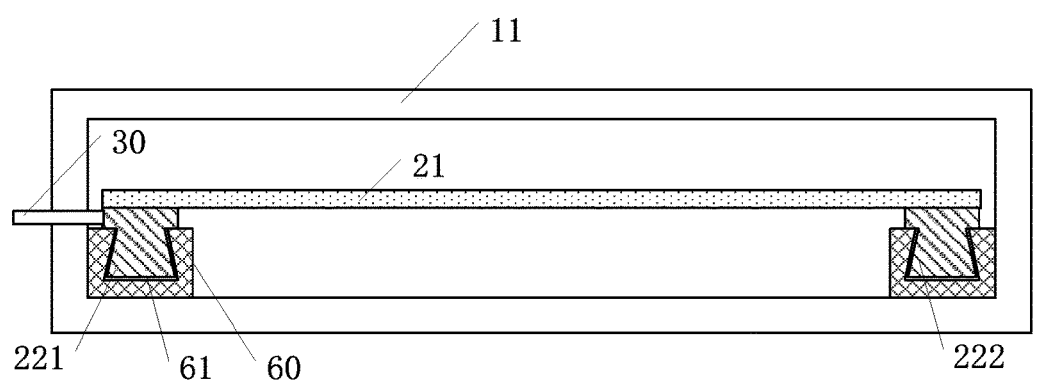
FIG. 11 is a schematic cross-sectional view of a structure of still another flexible display device according to an embodiment of the present disclosure.

FIG. 11 is a schematic cross-sectional view of a structure of still another flexible display device according to an embodiment of the present disclosure.

With reference to FIG. 10 and FIG. 11, in this embodiment, the box 10 further includes fixing parts 60 which are fixedly connected to the housing part 11.

The fixing part 60 includes a guide groove 61 which cooperates with the flexible carrying part 22. A portion of the first sub-part 221 at a side facing away from the flexible display panel 21 or a portion of the second sub-part 222 at a side facing away from the flexible display panel 21 is located in the guide groove 61.

During a process of the flexible display part 20 being wound or unwound, the guide groove 61 limits the movement of the flexible carrying part 22 in a winding or unwinding direction.

In this embodiment, the fixing part 60 is arranged in the receiving space of the housing part 11. The fixing part 60 may be made of a material with a certain rigidity, such as plastic, metal, glass, ceramic, or a combination thereof. The housing part 11 and the fixing part 60 may be made of the same material or different materials, which is not specifically limited herein.

The housing parts 11 and the fixing parts 60 may be made as one-piece structure. For example, the housing part 11 and the fixing parts 60 may be made as a one-piece structure by an injection molding process using a plastic material. Alternatively, the housing part 11 and the fixing part 60 may be separately formed and then assembled together. For example, the housing part 11 and the fixing part 60 may be fixed together by an adhesive material or by means of a mechanical structure. In this embodiment, a connection manner of the housing part 11 with the fixing part 60 is not limited.

The fixing part 60 is provided with the guide groove 61, and the guide groove 61 is configured to guide the flexible display part 20 to be unwound and to guide the flexible display part 20 to be received. Within the limit of the guide groove 61, the flexible carrying part 22 moves steadily along the X direction and the opposite direction of the X direction, and movement of the flexible carrying part 22 in other directions are reduced or avoided. In this way, stability and reliability of the flexible display device can be improved.

Figure 12:
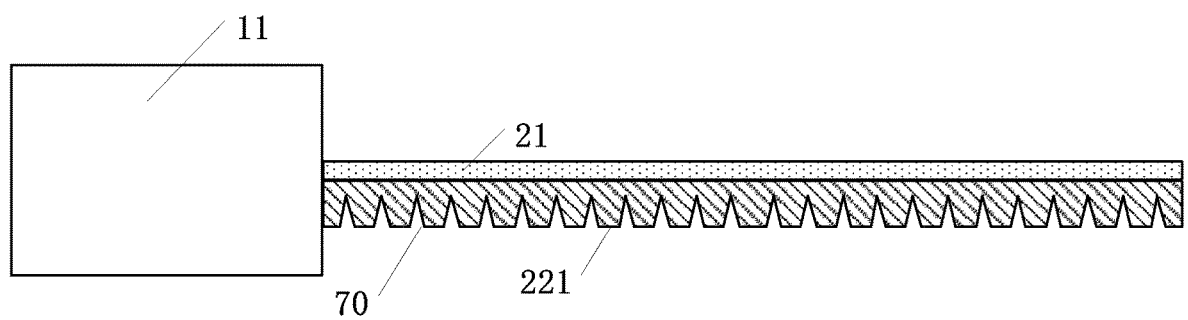
FIG. 12 is side view of still another flexible display device according to an embodiment of the present disclosure.

FIG. 12 is side view of still another flexible display device according to an embodiment of the present disclosure.

With reference to FIG. 11 and FIG. 12, in this embodiment, a plurality of dentate grooves 70 is provided on a surface of at least one of the first sub-part 221 and the second sub-part 222 facing away from the flexible display panel 21.

In this embodiment, the first sub-part 221 is provided with the dentate grooves 70. When the flexible display device is in the wound state, the dentate grooves 70 allows the first sub-part 221 to be wound more easily on the winding shaft 12, thus reducing a possibility of damage to the surface of the first sub-part 221 facing away from the flexible display panel 21, and thereby further improving the stability and reliability of the flexible display device.

It should be noted that, in the embodiments of the present disclosure, it is exemplary that the limit part is arranged at one side wall of the housing part 11. It can be understood that in other embodiments of the present disclosure, two limit parts may be included, and the two limit parts are respectively disposed at two opposite side walls of the housing part 11. The limit parts at the two sides may operate separately or simultaneously. When the limit part at one side is damaged, the limit part at the other side can still allow normal operation of the flexible display device. Moreover, when the limit parts at the two sides operate simultaneously, the flexible display part 20 can be further stably fixed at a set position, thereby further improving the performance and use experience of the flexible display device.

It should be noted that the flexible display devices provided in the embodiments of the present disclosure are merely illustrative, and the flexible display device may be, for example, any electronic device having a display function, such as a mobile phone, a tablet computer, a notebook computer, an e-book, and the like.

The flexible display devices provided by the above-mentioned embodiments of the present disclosure have at least the following beneficial effects.

The flexible display device includes the box and the flexible display part. The movable limit part is provided at the side wall of the box. The limit part has the function of limiting movement of the flexible display part, and the limit part contacts the flexible carrying part to limit its position. The structure thereof is simple, and the cost is low. When the limit part is damaged, it can be flexibly replaced and easily maintained. The limit part is moveable relative to the box during use as required. The operation thereof is flexible and convenient, and the position where the limit part contacts the flexible carrying part can be set according to actual needs, so that the flexible display part is accurately fixed at the set position with high accuracy when it is unwound.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A flexible display device, comprising:
a box comprising a housing part and a winding shaft fixedly connected to the housing part, wherein the winding shaft is located in a receiving space defined by the housing part;
a flexible display part comprising a flexible display panel and a flexible carrying part attached to a non-display surface of the flexible display panel, wherein a first end of the flexible display part is fixedly connected to the winding shaft; and
a limit part movably disposed in a side wall of the box, wherein the flexible display part has a wound state and an unwound state, wherein
in the wound state, the flexible display part is wound onto the winding shaft so as to be received in the receiving space; and
in the unwound state, a second end of the flexible display part and at least a portion of the flexible display part are unwound to an exterior of the receiving space, and the limit part is in contact with the flexible carrying part to limit movement of the flexible display part.

2. The flexible display device according to claim 1, wherein
the flexible carrying part comprises at least one limit groove configured to match the limit part; and
in the unwound state, the limit part is inserted in the at least one limit groove to limit the movement of the flexible display part.

3. The flexible display device according to claim 1, wherein
the flexible carrying part comprises at least one protrusion portion configured to match the limit part; and
in the unwound state, the limit part is snap-fitted to one of the at least one protrusion portion to limit the movement of the flexible display part.

4. The flexible display device according to claim 3, wherein
the limit part comprises a flexure strip, and a first end of the flexure strip is fixedly connected to the side wall; and
in the unwound state, a second end of the flexure strip is snap-fitted to one of the at least one protrusion portion.

5. The flexible display device according to claim 2, wherein
the limit part comprises a latch, a through hole is provided in the side wall, and the latch is movable within the through hole in a thickness direction of the side wall; and
in the unwound state, an end of the latch is inserted in one of the at least one limit groove.

6. The flexible display device according to claim 3, wherein
the limit part comprises a latch, a through hole is provided in the side wall, and the latch is movable within the through hole in a thickness direction of the side wall; and
in the unwound state, an end of the latch is snap-fitted to one of the at least one protrusion portion.

7. The flexible display device according to claim 5, wherein
the limit part comprises an electromagnetic coil assembly configured to control movement of the latch in the thickness direction of the side wall.

8. The flexible display device according to claim 6, wherein
the limit part comprises an electromagnetic coil assembly configured to control movement of the latch in the thickness direction of the side wall.

9. The flexible display device according to claim 1, wherein
the limit part comprises a bolt, a threaded hole matching the bolt is provided in the side wall, and the bolt is configured to be screwed in and out along a thickness direction of the side wall; and
in the unwound state, the bolt is screwed into the receiving space of the box to press the flexible carrying part.

10. The flexible display device according to claim 9, wherein
the flexible carrying part comprises at least one anti-slip portion; and
in the unwound state, the anti-slip portion matches the bolt to press the flexible carrying part.

11. The flexible display device according to claim 10, wherein
the anti-slip portion is an anti-slip recess or an anti-slip protrusion.

12. The flexible display device according to claim 2, wherein
the at least one limit groove comprises a plurality of limit grooves equally spaced from each other.

13. The flexible display device according to claim 3, wherein
the at least one protrusion portion comprises a plurality of protrusion portions equally spaced from each other.

14. The flexible display device according to claim 1, wherein
the flexible carrying part comprises a first sub-part and a second sub-part each of which is strip-shaped, and the first sub-part and the second sub-part are respectively attached on a third end and a fourth end of the flexible display panel, the third end and the fourth end being opposite to each other.

15. The flexible display device according to claim 14, wherein
a plurality of dentate grooves is provided on a surface of at least one of the first sub-part or the second sub-part facing away from the flexible display panel.

16. The flexible display device according to claim 1, wherein
the box further comprises a fixing part fixedly connected to the housing part;
the fixing part comprises a guide groove configured to match the flexible carrying part, and a portion of the flexible carrying part facing away from the flexible display panel is located in the guide groove; and during a process of the flexible display part being wound or unwound, the guide groove limits movement of the flexible carrying part in a winding or unwinding direction.

17. The flexible display device according to claim 1, wherein
the flexible carrying part is made of a flexible material.

18. The flexible display device according to claim 17, wherein
the flexible carrying part is made of a material comprising polyimide.

19. The flexible display device according to claim 1, wherein the flexible display panel is an organic light-emitting display panel or an electronic paper display panel.

* * * * *